United States Patent [19]
Durden et al.

[11] 3,879,468
[45] Apr. 22, 1975

[54] 2-(POLY SUBSTITUTED PHENYL)-1,3-INDANDIONE COMPOUNDS

[75] Inventors: John A. Durden, South Charleston, W. Va.; Anthony A. Sousa, Raleigh, N.C.

[73] Assignee: Union Carbide Corporation, New York, N.Y.

[22] Filed: May 13, 1971

[21] Appl. No.: 143,206

Related U.S. Application Data

[63] Continuation-in-part of Ser. No. 816,024, April 14, 1969, abandoned.

[52] U.S. Cl. .................. 260/590; 71/123; 424/331
[51] Int. Cl. ..................... C07c 49/76; C07c 49/82
[58] Field of Search ..................................... 260/590

[56] References Cited
UNITED STATES PATENTS
| | | | |
|---|---|---|---|
| 3,389,986 | 6/1968 | DiBella | 260/590 |
| 3,622,632 | 11/1971 | Holland et al. | 260/590 |

FOREIGN PATENTS OR APPLICATIONS
| | | | |
|---|---|---|---|
| 245,170 | 9/1962 | Australia | 260/590 |

OTHER PUBLICATIONS

C. Bwynes, Recevil Vol. 85, pp. 1259–1263 (1966).

Kilgore et al., Ind. Eng. Chem. 34 494–497 (1942).
Chem. Abstracts 66, 84601v (1967).

*Primary Examiner*—Daniel D. Horwitz
*Attorney, Agent, or Firm*—Robert C. Brown

[57] ABSTRACT

A new series of 2-(poly substituted phenyl)-1,3-indandione compounds have been found to have exceptional miticidal and herbicidal activity. These compounds may be represented by the following general formula:

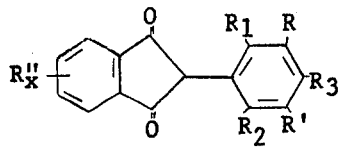

where R and R' are hydrogen, hydroxy, lower alkoxy or halogen; R" is lower alkyl, lower alkoxy, halogen, nitro or trihalomethyl; x is 0 or a positive integer from 1 to 4 and $R_1$, $R_2$, and $R_3$ are lower alkyl, with the proviso that when R and R' are both hydrogen, x is a positive integer.

6 Claims, No Drawings

2-(POLY SUBSTITUTED PHENYL)-1,3-INDANDIONE COMPOUNDS

This application is a continuation-in-part of U.S. application Serial No. 816,024, filed Apr. 14, 1969 and now abandoned.

The novel compounds of this invention are 2-(poly substituted phenyl)-1,3-indandione compositions corresponding to the following general formula:

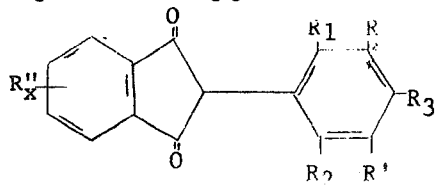

wherein R and R' are the same or different and are hydrogen, hydroxy, lower alkoxy or halogen; R" is lower alkoxy, halogen, nitro or trihalomethyl; x is 0 or a positive integer from 1 to 4; $R_1$, $R_2$, and $R_3$ are lower alkyl with the proviso that when R and R' are both hydrogen, x is a positive integer. For the sake of convenience, the substituents: hydroxy, lower alkoxy and halogen are sometimes collectively referred to hereinafter as 'A-Substituents' and the substituents: lower alkoxy, halogen, nitro and tri-halomethyl are sometimes collectively referred to hereinafter as 'B-Substituents'.

Illustrative of the new compositions of our invention are the following:

2-(2',4',6'-trimethyl-3-methoxyphenyl)-1,3indandione
2-(2',4',6'-trimethyl-3-ethoxyphenyl)-1,3-indandione
2-(2',4',6'-trimethyl-3-hydroxyphenyl)-1,3-indandione
2-(2',4',6'-trimethyl-3-chlorophenyl)1,3-indandione
2-(2',4',6'-trimethyl-3-bromophenyl)-1,3-indandione
2-(2',4',6'-trimethyl-3-fluorophenyl)-1,3-indandione
2-(3',4',6'-trimethyl-3,5-dichlorophenyl)1,3-indandione
2-(2',6'-dimethyl-4-isopropyl-3-methoxyphenyl)-1,3-indandione
2-(2',4',6'-trimethylphenyl)-4-methyl-1,3-indandione
2-(2',4',6'-trimethylphenyl)-5-methyl-1,3-indandione
2-(2',4',6'-trimethylphenyl)-5-t-butyl-1,3-indandione
2-(2',4',6'-trimethylphenyl)-4,5-dimethyl-1,3-indandione
2-(2',4',6'-trimethylphenyl)-4,6-dimethyl-1,3-indandione
2-(2',4',6'-trimethylphenyl)-4,7-dimethyl-1,3-indandione
2-(2',4',6'-trimethylphenyl)-5,6-dimethyl-1,3-indandione
2-(2',4',6'-trimethylphenyl)-4-methoxy-1,3-indandione
2-(2',4',6'-trimethylphenyl)-5-methoxy-1,3-indandione
2-(2',4',6'-trimethylphenyl)-4-chloro-1,3-indandione
2-(2',4',6'-trimethylphenyl)-5-chloro-1,3-indandione
2-(2',4',6'-trimethylphenyl)-4-bromo-1,3-indandione
2-(2',4',6'-trimethylphenyl)-4-nitro-1,3-indandione
2-(2',4',6'-trimethylphenyl)-4-trichloromethyl-1,3-indandione
2-(2'-ethyl-4',5',6'-trimethylphenyl)-1,3-indandione We have found that the compositions falling within the scope of the generic formula given above exhibit varying degrees of biological activity. The compositions in which the functional groups are relatively small generally exhibit higher activity and thus in case of alkyl substituents methyl and ethyl are preferred and in the case of alkoxy substituents methoxy and ethoxy are preferred.

All of these compounds can be prepared conveniently by reacting an appropriately substituted benzaldehyde composition with an appropriately substituted phthalide composition in accordance with the general reaction scheme set forth below (Equation 1) wherein R, R', $R_1$, $R_2$, $R_3$ and x are as defined above.

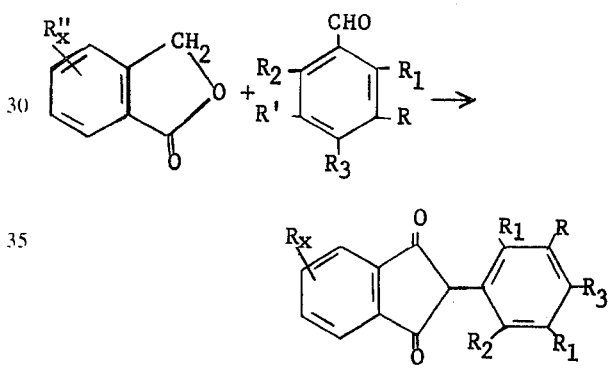

EQUATION 1

Alternatively, 2-arylindandiones may be prepared by reacting arylacetic acids with phthalic anhydride in the presence of salts such as sodium acetate at temperatures of 200° to 280°C. to produce the corresponding benzylidenephthalide. This intermediate may be rearranged to the isomeric 2-aryl-1,3-indandione by treatment with basic reagents such as sodium methoxide in methanol. This sequence is shown in Equation 2 below:

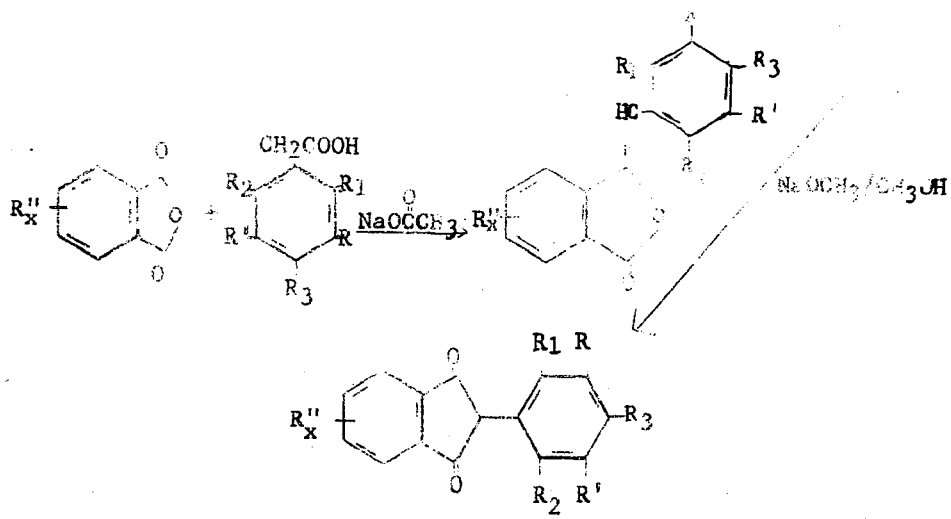

EQUATION 2

The following representative specific examples are provided to more clearly illustrate the method of preparing the new compositions of our invention. In order to increase yields and improve the reaction rate it is preferred to conduct the reaction in the presence of an alkali metal alcoholate catalyst, especially sodium methoxide.

Certain compounds, representative of those useful in accordance with this invention, were tested with respect to their miticidal and herbicidal activity.

Suspensions of the test compounds were prepared by dissolving 1 gram of compound in 50 milliliters of acetone in which had been dissolved 0.1 gram (10 percent of the weight of compound) of an alkylphenoxyethanol surfactant, as an emulsifying or dispersing agent. The resulting solution was mixed into 160 milliliters of water to give roughly 200 milliliters of a suspension containing the compound in finely divided form. The thus-prepared stock suspension contained 0.5 percent by weight of compound. The test concentrations employed in the tests described hereinbelow were obtained by diluting the stock suspension with water. Dilution tests were carried out to determine the $LD_{50}$ and $LD_{95}$ (concentration of chemical required to kill 50 and 95 percent, respectively, of the mite population) values for each test compound. The test procedures were as follows:

Mite Foliage Spray Test

Adults and nymphal stages of the two-spotted mite (*Tetranychus urticae* (Koch)), reared on Tender-green bean plants at 80+5°F. and 50±5 percent relative humidity, were the test organisms. Infested leaves from a stock culture were placed on the primary leaves of two bean plants 6 to 8 inches in height, growing in a two-and-a-half inch clay pot. 150–200 Mites, a sufficient number for testing, transferred from the excised leaves to the fresh plants in a period of 24 hours. Following the 24 hour transfer period, the excised leaves were removed from the infested plants. The test compounds were formulated by diluting the stock suspension with water to provide suspensions containing varying amounts of test compound per million parts of final formulation. The potted plants (one pot per compound) were place on a revolving turntable and sprayed with 100–110 milliliters of test compound formulation by use of a DeVilbis spray gun set at 40 psig. air pressure. This application, which lasted 30 seconds, was sufficient to wet the plants to run-off. As a control, 100–110 milliliters of a water solution containing acetone and emulsifier in the same concentrations as the test compound formulation, but containing no test compound, were also sprayed on infested plants. The sprayed plants were held at 80+5°F. and 50+5 percent relative humidity for 6 days, after which a mortality count of motile forms was made. Microscopic examination for motile forms was made on the leaves of the test plants. Any individual which was capable of locomotion upon prodding was considered living.

Mite Ovicide Test

The test organism was the egg of the twospotted mite (Tetranychus urticae (Koch)), as obtained from adults reared on Tendergreen bean plants under controlled conditions of 80±5°F. and 50+5 percent relative humidity. Heavily infested leaves from a stock culture were placed on the primary leaves of two bean plants 6 to 8 inches in height, growing in a 2½ inch clay pot. Females were allowed to oviposit for a period of 48 hours and then the leaves of the infested plants were dipped in a solution containing 800 parts of tetraethyl pyrophosphate per million parts of water in order to destroy the reproductory forms and thus prevent further egg laying. This solution of tetraethyl pyrophosphate does not affect the viability of the eggs. The plants were allowed to dry thoroughly. The test compounds were formulated by diluting the stock suspension with water to give a suspension containing varying amounts of test compound per million parts of final formulation. The potted plants (one pot per compound) were placed on a revolving turntable and sprayed with 100–110 milliliters of test compound formulation by use of a DeVilbis spray gun set at 40 psig. air pressure. This application, which lasted 30 seconds, was sufficient to wet the plants to run-off. As a control, 100–110 milliliters of a water solution containing acetone and emulsifier in the same concentrations as the test compound formulation, but containing no test compound, were also sprayed on plants infested with eggs. The sprayed plants were held at 80±5°F. and 50+5 percent relative humidity for 6 days, after which a microscopic examination was made of unhatched (dead) and hatched (living) eggs.

Preliminary Herbicide Seed Germination Test

The following seeds are used in this test:
Perennial rye grass - Solium perenne
Crabgrass - Digitaria sanquinalis
Red root pigweed - Amaranthus retroflexus
Mustard - Brassica pincea var. foliosa (Florida broadleaf)

Two Seed-soil mixtures are prepared as follows:

| Mixture I  | 196 cc.    | Rye grass seed         |
|------------|------------|------------------------|
|            | 75 cc.     | Mustard seed           |
|            | 18,000 cc. | Sifted, fairly dry soil |
| Mixture II | 99 cc.     | Crabgrass seed         |
|            | 33 cc.     | Amaranthus             |
|            | 18,000 cc. | Sifted, fairly dry soil |

Each of above mixtures is rolled separately in 5 gallon containers for approximately one-half hour on ball mill to insure uniform mixing of seeds and soil. For each compound four 3-inch pots are filled with soil to within 1½ inches of top of pots. To 2 of these pots are added 70 cc. of Mixture I. To the remaining 2 pots are added 70 cc. of Mixture II. The seed-soil mixture is tamped firmly, and the pots are removed to greenhouse and watered lightly. About 2 hours after planting, 25 milliliters of the test solution are added to each of 2 pots for each soil-seed mixture; i.e., one replicate of each seed mixture per concentration. An equal volume of a water solution containing acetone and an emulsifier in the same concentration as the herbicidal mixture but without the candidate herbicide is also added to each of the soil-seed mixtures. These pots are used as check or control units. The test compounds are formulated by standard procedure of solution in acetone, addition of an emulsifier, and dilution with water. Preliminary tests are conducted at 1000 ppm. and 100 ppm. The pots are held in the greenhouse and watered lightly until results are taken. Ten to twelve days after application of chemical, injury is noted for each species by comparing treated vs. untreated pots. Ratings are made at both the high and the low concentrations (1000 ppm and 100 ppm) according to the following designations:

5 = no seedlings emerged
4 = few seedlings emerged and/or very severe stunting
3 = moderate reduction in stand and/or moderate stunting 2 = very slight reduction in stand and/or slight stunting
1 = no injury; seedlings appear no different with respect to stand or growth than untreated controls Accordingly, the maximum rating for one test seed species is 10 and the maximum possible total preemergence rating is 40 (10 for each of the four test speed species).

The test data are set forth in the following table:

TABLE I*

| COMPOSITION | M.P. °C. | Miticidal Activity | | | | HERBICIDAL ACTIVITY |
|---|---|---|---|---|---|---|
| | | Adult | | OVA | | TOTAL |
| | | LD$_{50}$ | LD$_{85}$ | LD$_{50}$ | LD$_{85}$ | PREEMERGENCE |
| 2-(2',4',6'-trimethyl-3-methoxyphenyl)-1,3-indandione | 115–120 | 20 | 500 | 120 | 200 | 24 |
| 2-(2',4',6'-trimethyl-3-hydroxyphenyl)-1,3-indandione | 205–211 | — | — | — | — | 23 |
| 2-(2',4',6'-trimethyl-3-chlorophenyl)-1,3-indandione | 137–140 | — | — | 500 | — | 23 |
| 2-(2',4',6'-trimethyl-3-bromophenyl)-1,3-indandione | 135–138 | — | — | 500 | — | 24 |
| 2-(2',4',6'-trimethylphenyl)-4-methyl-1,3-indandione | 207–209 | 500 | — | 22 | 60 | 25 |
| 2-(2',4',6'-trimethylphenyl)-5-methyl-1,3-indandione | 178–180 | 9 | 500 | 8 | 60 | 37 |
| 2-(2',4',6'-trimethylphenyl)-5-t-butyl-1,3-indandione | 172–174 | 65 | 500 | 18 | 100 | 32 |
| 2-(2',4',6'-trimethylphenyl)-4,5-dimethyl-1,3-indandione | | 500 | — | 500 | — | 24 |
| 2-(2',4',6'-trimethylphenyl)-4,6-dimethyl-1,3-indandione | 143–147 | 40 | 500 | 40 | 100 | 24 |
| 2-(2',4',6'-trimethylphenyl)-4,7-dimethyl-1,3-indandione | 172–174 | 500 | — | — | — | 17 |
| 2-(2',4',6'-trimethylphenyl)-5,6-dimethyl-1,3-indandione | 181–182.5 | 500 | — | 60 | 90 | 28 |
| 2-(2',4',6'-trimethylphenyl)-4-methoxy-1,3-indandione | 201–203.5 | 25 | 500 | x | 30 | 32 |
| 2-(2',4',6'-trimethylphenyl)-5-methoxy-1,3-indandione | 187–189 | 15 | 500 | 50 | 190 | 27 |
| 2-(2',4',6'-trimethylphenyl)-4-chloro-1,3-indandione | 225–226 | — | — | — | — | 24 |
| 2-(2',4',6'-trimethylphenyl)-5-chloro-1,3-indandione | 148–150 | 75 | 500 | 110 | 250 | 29 |
| 2-(2',4',6'-trimethylphenyl)-4-bromo-1,3-indandione | 235.5–238 | — | — | — | — | 27 |

* - Indicates absence of significant activity
x Indicates not tested.

The new compounds of this invention may be applied as miticides and herbicides according to methods known to those skilled in the art. Pesticidal compositions containing the compounds as the active toxicant will usually comprise a carrier and/or a diluent, either liquid or solid.

Suitable liquid diluents or carriers include water, petroleum distillates, or other liquid carriers with or without surface active agents. Liquid concentrates may be prepared by dissolving one of these compounds with a non-phytotoxic solvent such as acetone, xylene, or nitrobenzene and dispersing the toxicants in water with the aid of suitable surface active emulsifying and dispersing agents.

The choice of dispersing and emulsifying agents and the amount employed is dictated by the nature of the composition and the ability of the agent to facilitate the dispersion of the toxicant. Generally, it is desirable to use as little of the agent as is possible, consistent with the desired dispersion of the toxicant in the spray so that rain does not re-emulsify the toxicant after it is applied to the plant and wash it off the plant. Nonionic, anionic, or cationic dispersing and emulsifying agents may be employed, for example, the condensation products of alkylene oxides with phenol and organic acids, alkyl aryl sulfonates, complex ether alcohols, quaternary ammonium compounds, and the like.

In the preparation of wettable powder or dust or granulated compositions, the active ingredient is dispersed in and on an appropriately divided solid carrier such as clay, talc, bentonite, diatomaceous earth, fullers earth, and the like. In the formulation of the wettable powders the aforementioned dispersing agents as well as lignosulfonates can be included.

The required amount of the toxicants contemplated herein may be applied per acre treated in from 1 to 200 gallons or more of liquid carrier and/or diluent or in from about 5 to 500 pounds of inert solid carrier and/or diluent. The concentration in the liquid concentrate will usually vary from about 10 to 95 percent by weight and in the solid formulations from about 0.5 to about 90 percent by weight. Satisfactory sprays, dusts, or granules for general use contain from about ¼ to 15 pounds of active toxicant per acre.

The pesticides contemplated herein prevent attack by mites upon plants or other material to which the pesticides are applied, and they have high residual toxicity. The toxicants are chemically inert and they are now compatible with substantially any other constituents of the spray schedule, and they may be used in the soil, upon the seeds, or the roots of those plants in which they induce no herbicidal effects.

What is claimed is:

1. As new compositions of matter, 2-(polysubstituted phenyl)-1,3-indandione compounds of the formula:

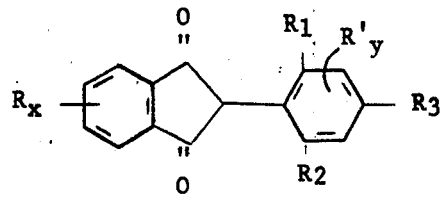

where R is lower alkoxy or lower alkyl, R' is lower alkoxy, $R_1$, $R_2$ and $R_3$ are lower alkyl, $x$ is a positive integer from 1 to 4 and $y$ is 0, 1 or 2.

2. 2-(2',4',6'-trimethylphenyl)-4-methyl-1,3-indandione.

3. 2-(2',4',6'-trimethylphenyl)-5-methyl-1,3-indandione.

4. 2-(2',4',6'-trimethylphenyl)-5-t-butyl-1,3-indandione.

5. 2-(2',4',6'-trimethylphenyl)-5,6-dimethyl-1,3-indandione.

6. 2-(2',4',6'-trimethylphenyl)-4-methoxy-1,3-indandione.

* * * * *